(12) United States Patent
Abdollahian et al.

(10) Patent No.: US 9,412,153 B2
(45) Date of Patent: Aug. 9, 2016

(54) USING DEPTH FOR RECOVERING MISSING INFORMATION IN AN IMAGE

(71) Applicant: SONY CORPORATION, Tokyo (JP)

(72) Inventors: Golnaz Abdollahian, San Francisco, CA (US); Mohammad Gharavi-Alkhansari, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/567,683

(22) Filed: Dec. 11, 2014

(65) Prior Publication Data

US 2016/0171669 A1    Jun. 16, 2016

(51) Int. Cl.
*G06K 9/40* (2006.01)
*G06T 5/00* (2006.01)
*G06T 11/60* (2006.01)
*G06T 7/00* (2006.01)

(52) U.S. Cl.
CPC ............... *G06T 5/005* (2013.01); *G06T 7/0051* (2013.01); *G06T 11/60* (2013.01); *G06T 2207/10028* (2013.01)

(58) Field of Classification Search
CPC .................. G06T 5/005; G06T 7/0081; G06T 2207/20136; G06T 2200/04; G06F 17/30247
USPC ......................................... 382/254–255, 275
See application file for complete search history.

(56) References Cited

U.S. PATENT DOCUMENTS

| 7,755,645 | B2* | 7/2010 | Sun | G06T 11/60 345/582 |
| 8,731,324 | B1* | 5/2014 | Huang | G06T 5/005 382/167 |
| 9,014,474 | B2* | 4/2015 | Hung | G06T 3/4092 382/167 |
| 2006/0285762 | A1* | 12/2006 | Sun | G06T 5/005 382/254 |
| 2011/0123113 | A1 | 5/2011 | Berretty et al. | |
| 2013/0315498 | A1* | 11/2013 | Yurkov | G06T 7/0075 382/254 |
| 2014/0002595 | A1 | 1/2014 | Po et al. | |

OTHER PUBLICATIONS

Gautier, Josselin et al., "Depth-Based Image Completion for View Synthesis", IRISA/Universitie de Rennes/IEEE, 2011, 4 pages.
Heithausen, Cordula et al., "Depth-Adaptive Inpainting Algorithm for 3D Video Sequences", Institute of communications Engineering, RWTH Aachen University, Poster, Prague, May 16, 2013, 6 pages.

* cited by examiner

*Primary Examiner* — Kanjibhai Patel
(74) *Attorney, Agent, or Firm* — John P. O'Banion

(57) ABSTRACT

An inpainting apparatus and method are described for infilling of blank areas from which an image object or area has been missing, removed, or moved from. Structure regions that reach the edge of the removed object area are identified and then prioritized as to fill order based on depth (distance) from the camera. Then these structure regions are filled in prioritized fill order, followed by remaining (homogeneous) areas to generate the inpainted image. The method may be performed on any desired computer-enabled electronic device, including cell phones, digital cameras, laptops, tablets, personal computers and other processor-equipped electronic devices.

16 Claims, 3 Drawing Sheets

USING DEPTH FOR RECOVERING MISSING INFORMATION IN AN IMAGE

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Technological Field

This disclosure pertains generally to image inpainting, and more particularly to utilizing depth information for recovering missing information when performing image frame inpainting. Herein, depth information refers to the distances of points in the scene from the camera that captured the image, or their distances from such camera when measured along the optical axis of the camera.

2. Background Discussion

The process of image inpainting involves reconstructing missing parts of an image frame, or video frame, that have been destroyed or intentionally removed. If an object captured within an image is deleted, or moved, the area that was covered by (obscured by) that object in the original image, has to be reconstructed so that the resulting image still appears "natural" looking. That is to say that it is desirable that if the viewer has not seen the original image, they would be unable to notice that the image has been altered by removing, or moving an object.

There are a number of current inpainting techniques described in the literature. In general, these methods can be categorized into the following categories: (a) diffusion-based approaches, (b) sparse representation of images, and (c) exemplar-based approaches.

These methods can produce generally suitable outputs when the inpainting process involves homogeneous and/or small areas with no complicated structures. However, in scenes involving large missing areas with multiple occluded regions and structures, these techniques leave visible artifacts in the resultant image, especially in the edge and structured areas.

Accordingly, a need exists for inpainting reconstruction techniques which are able to generate desirable results even for large inpainted areas which include structure.

BRIEF SUMMARY

The present disclosure provides inpainting apparatus and methods which provide natural looking results over a wider range of size and extent of non-uniformity for the inpainting. It will be readily recognized that filling of very small areas, or areas which can be filled with a uniform fill, can be substantially met by some existing inpainting methods. The larger challenge arises when the object is relatively large (e.g., greater than about 5-10% of the frame height and or width) and is further complicated when the object is surrounded by several different regions and intersecting structures (lines, planes, and other structures). In the latter case, it is very difficult to resolve the missing, removed, or moved structures or areas such that the reconstructed image has a natural-looking appearance, with all structures remaining contiguous across any inpainting and otherwise properly represented. It will be understood that the majority of visible artifacts in the inpainting results arise around the edges or region boundaries. In large measure a scene is "natural" looking when structures adjacent to the removed object are reconstructed through the area of the removed object and there are no significant artifacts left over from the inpainting process. The presented technology utilizes depth information when performing the inpainting so as to overcome many shortcomings of previous approaches.

Inpainting apparatus and techniques are utilized in a number of application areas, the following being given by way of example and not limitation: (a) for reconstructing missing parts in scanned or old photos. For removing text or logos overlaid on an image or video frame; (b) for removing, or moving, undesired object(s) from an image or video; (c) for recovering missing blocks in image coding and transmission; (d) for addressing disocclusion problems in stereo imaging, whereby occluded areas in a digital image are recovered in response to interpolation from their vicinity; (e) for generating various 3D effects where one or more objects from a still photo are extracted into a foreground and motion video segments generated of the image; and (f) for zooming and super-resolution of image and video frames. One of ordinary skill in the art will recognize that the technology presented herein can also be utilized for additional applications, and combination thereof.

Further aspects of the technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The description will be more fully understood by reference to the following drawings which are for illustrative purposes only:

DETAILED DESCRIPTION

Inpainting is performed in response to a process which involves identifying the existence of adjacent structures, and using depth information to set priorities for the infilling order of these structures. Structure regions are filled in order, and then the remaining (homogeneous) regions are filled to produce the inpainted image.

Figure 1:
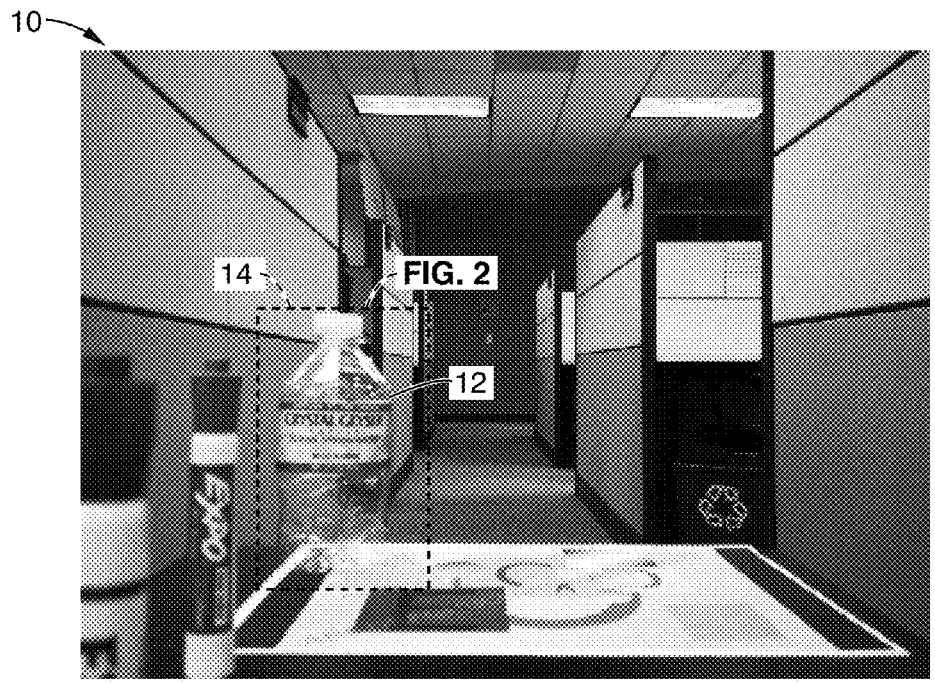
FIG. 1 is an image used by way of example for performing inpainting according to an embodiment of the present technology.

FIG. 1 depicts an example image (or video frame) 10, showing region 14 in which a bottle as object 12 is being removed and infilled using an inpainting method.

Figure 2:
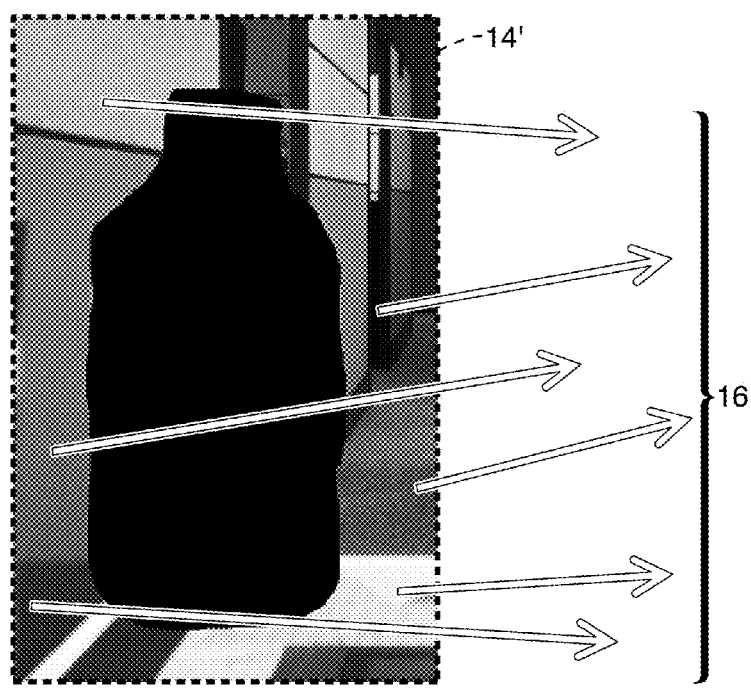
FIG. 2 is a cropped version of the image in FIG. 1 after removal of an object, with arrows indicating the various surface structures which interact at the edge of the object.

FIG. 2 depicts a close-up portion 14' of the area surrounding object 12, which has been removed leaving a black silhouette (i.e., a two-dimensional representation of object outline as a cutout or configurational drawing, uniformly filled in with black) of object 12. A number of surface structures 16 can be seen in the figure at the object boundary. The problem arises as to how the inpainting process can automatically determine which of these surfaces to propagate inside of the missing region (e.g., silhouette), how far they should be propagated, and how to handle interactions between structures (e.g., intersections). A number of problems arise during inpainting if the order of filling associated with relevant structures is not known. Various forms of artifacts arise in response to these problems.

Figure 3:
FIG. 3 is an image showing structural delineations and extensions in a removed object in preparation for inpainting according to an embodiment of the present technology.

FIG. 3 illustrates an ideal example 30 of how the nearby structure lines should be extended through the missing object area 32. Depth information is utilized in the present technology to assure proper filling order. In at least one embodiment, a depth map of the scene is utilized. One of ordinary skill in the art will appreciate that a number of techniques are available for obtaining information about depth for different parts of an image, any of which may be utilized without limitation with the disclosed inpainting apparatus and method. By way of example and not limitation, depth can be obtained in response to using two picture blur matching, such as obtained during an autofocusing process.

The inpainting apparatus and method propagates elements/structures that are closer to the camera first, because a closer object can occlude a farther object but the opposite does not arise. Thus, structures are detected and a priority assigned to each structure based on its depth value, the closer elements/structures to the camera receiving higher priorities.

Figure 4:
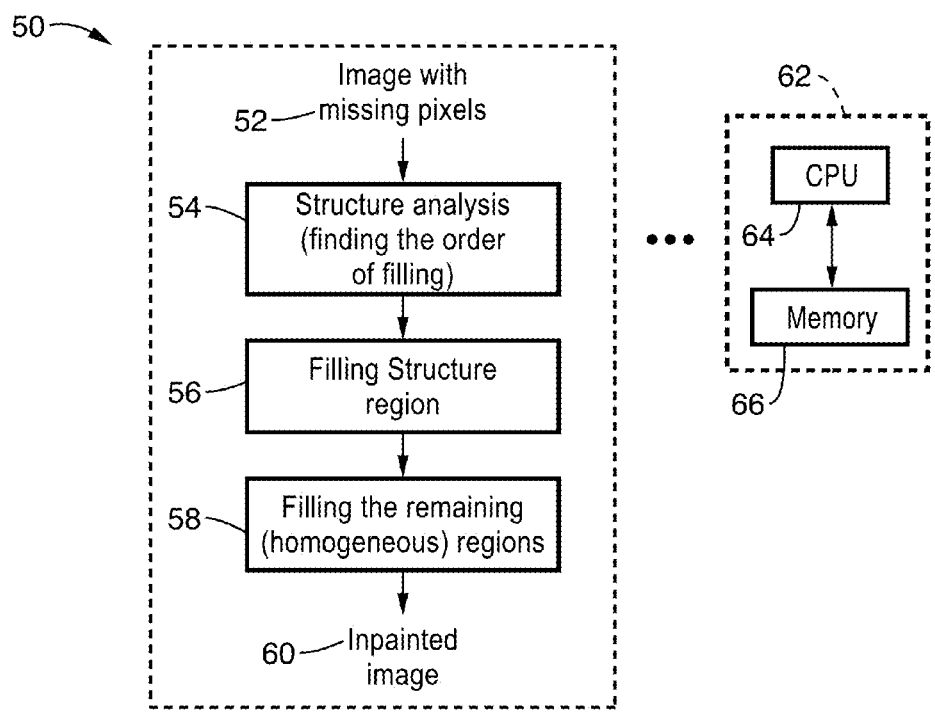
FIG. 4 is a flow diagram of inpainting according to an embodiment of the present technology.

FIG. 4 illustrates an example embodiment 50 of image inpainting. An image is obtained from which an object or an area is removed (missing or moved to a different location) leaving an image with missing pixels 52. A structure analysis is performed 54 with the order of filling being determined on the basis of depth from the camera aperture. Each structure region is then filled 56 in a priority order in response to depth. Filling is then performed 58 for the remaining regions. After filling, an inpainted image is output 60.

It will be appreciated that the image processing described above for performing the inpainting may be implemented on a wide range of devices which include programmable control circuits 62 having one or more computer processor devices 64 (e.g., CPU, microprocessor, microcontroller, computer enabled ASIC, etc.) and associated memory 66 (e.g., RAM, DRAM, NVRAM, FLASH, computer readable media, etc.) whereby programming stored in the memory and executable on the processor perform the steps of the methods described herein. The presented technology is non-limiting with regard to memory and computer-readable media, insofar as these are non-transitory, and thus not constituting a transitory electronic signal.

It will be appreciated that the inpainting method described herein can be performed in response to software (programming) which is capable of being executed on a number of devices, including but not limited to cell phones, digital cameras, tablet computers, laptop computers, personal computers and other processor equipped electronic equipment. The programming may be resident on devices as manufactured, or installed on these devices afterward, without limitation.

Figure 5:
FIG. 5 is an image of inpainting the removed object from original FIG. 1, without the use of depth for determining inpainting order.

FIG. 5 depicts the original image of FIG. 1 after removing the water bottle object and performing an inpainting process without the benefit of the depth mapping 70.

Figure 6:
FIG. 6 is an image of inpainting the removed object from original FIG. 1, utilizing depth for determining inpainting order according to an embodiment of the present technology.

FIG. 6 depicts the original image of FIG. 1 after removing the water bottle object and performing an inpainting process which utilizes the depth mapping, structure analysis, and prioritized order inpainting of the present disclosure 90.

Embodiments of the present description may be described with reference to flowchart illustrations of methods and systems according to embodiments of the description, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

It will further be appreciated that "programming" as used herein refers to one or more instructions that can be executed by a processor to perform a function as described herein. The programming can be embodied in software, in firmware, or in a combination of software and firmware. The programming can be stored local to the device in non-transitory media, or can be stored remotely such as on a server, or all or a portion of the programming can be stored locally and remotely. Programming stored remotely can be downloaded (pushed) to the device by user initiation, or automatically based on one or more factors. It will further be appreciated that as used herein, that the terms processor, central processing unit (CPU), and computer are used synonymously to denote a device capable of executing the programming and communication with input/output interfaces and/or peripheral devices.

From the description herein, it will be appreciated that that the present disclosure encompasses multiple embodiments which include, but are not limited to, the following:

1. An apparatus for inpainting missing, removed, or moved, objects or areas in an image frame, comprising: (a) a computer processor; and (b) programming executable on said computer processor for performing steps comprising: (b)(i) identifying structure regions that reach an edge of a missing, removed, or moved area in an image frame; (b)(ii) prioritizing a fill order for each structure region in response to its depth (distance) from the camera; (b)(iii) filling each said structure region in its prioritized fill order; and (b)(iv) filling remaining areas of the missing, removed, or moved, object area to complete inpainting of the image frame.

2. The apparatus of any preceding embodiment, wherein said programming executable on said computer processor is configured for performing said identifying structure regions in prioritizing a fill order for structure regions in response to a structure analysis.

3. The apparatus of any preceding embodiment, wherein said programming executable on said computer processor is configured for utilizing information about said depth to set priorities for infilling order of structures, so that structure regions are filled in order, after which remaining homogeneous regions are filled to produce the inpainted image.

4. The apparatus of any preceding embodiment, wherein said programming executable on said computer processor is configured for detecting structures and assigning a priority to each structure based on its depth value, with elements and structures closer to an image capture device receiving higher priorities, because a close object can occlude a farther object but a farther object does not occlude a closer object.

5. The apparatus of any preceding embodiment, wherein information about depth across the image frame is obtained prior to commencing inpainting.

6. The apparatus of any preceding embodiment, wherein said information about depth is obtained in response to two picture blur matching.

7. The apparatus of any preceding embodiment, wherein said two picture blur matching is performed during an auto-focusing process.

8. The apparatus of any preceding embodiment, wherein results from said inpainting is configured so that structures adjacent to a missing, removed, or moved, object are reconstructed through the missing, removed, or moved object, wherein no significant artifacts are left over from the inpainting process.

9. The apparatus of any preceding embodiment, wherein said apparatus is configured for use in an application selected from the group of applications consisting of: (a) reconstructing missing parts in scanned or old photos; (b) removing text or logos overlaid on an image or video frame; (c) removing, or moving, undesired object(s) from an image or video; (d) recovering missing blocks in image coding and transmission; (e) addressing disocclusion problems in stereo imaging, whereby occluded areas in a digital image are recovered in response to interpolation from their vicinity; (f) generating various 3D effects where one or more objects from a still photo are extracted into a foreground and motion video segments generated of that image; and (g) zooming and super-resolution of image and video frames.

10. An apparatus for inpainting missing, removed, or moved, objects or areas in an image frame, comprising: (a) a computer processor; and (b) programming executable on the computer processor for performing steps comprising: (b)(i) identifying structure regions that reach an edge of a missing, removed, or moved area in an image frame; (b)(ii) prioritizing a fill order based on a structure analysis for each structure region in response to its depth (distance) from a device capturing said image frame; (b)(iii) filling each said structure region in its prioritized fill order based on depth; and (b)(iv) filling remaining homogeneous areas of the missing, removed, or moved, object area to complete inpainting of an image.

11. The apparatus of any preceding embodiment, wherein said programming executable on said computer processor is configured for detecting structures and assigning a priority to each structure based on its depth value, with elements and structures closer to an image capture device receiving higher priorities, because a close object can occlude a farther object but a farther object does not occlude a closer object.

12. The apparatus of any preceding embodiment, wherein information about depth across the image is obtained prior to commencing inpainting.

13. The apparatus of any preceding embodiment, wherein said information about depth is obtained in response to two picture blur matching.

14. The apparatus of any preceding embodiment, wherein said two picture blur matching is performed during an auto-focusing process.

15. The apparatus of any preceding embodiment, wherein results from said inpainting is configured so that structures adjacent to a missing, removed, or moved, object are reconstructed through the missing, removed, or moved object, wherein no significant artifacts are left over from the inpainting process.

16. The apparatus of any preceding embodiment, wherein said apparatus is configured for use in an application selected from the group of applications consisting of: (a) reconstructing missing parts in scanned or old photos; (b) removing text or logos overlaid on an image or video frame; (c) removing, or moving, undesired object(s) from an image or video; (d) recovering missing blocks in image coding and transmission; (e) addressing disocclusion problems in stereo imaging, whereby occluded areas in a digital image are recovered in response to interpolation from their vicinity; (f) generating various 3D effects where one or more objects from a still photo are extracted into a foreground and motion video segments generated of that image; and (g) zooming and super-resolution of image and video frames.

17. A method for inpainting missing, removed, or moved, objects or areas in an image frame, comprising: (a) identifying structure regions that reach an edge of a missing, removed, or move area in an image frame for which image processing is being performed on a computer-enabled device; (b) prioritizing a fill order for each structure region in response to its depth (distance) from a camera device capturing said image frame; (c) filling each said structure region in its prioritized fill order within an inpainting process; and (d) filling remaining areas of the removed object area within the inpainting process.

18. The method of any preceding embodiment, wherein said detecting structures and assigning a priority to each structure based on its depth value is performed so that elements and structures closer to an image capture device receive higher priorities, because a close object can occlude a farther object but a farther object does not occlude a closer object.

19. The method of any preceding embodiment, wherein results from said inpainting is configured so that structures adjacent to a missing, removed, or moved, object are reconstructed through the missing, removed, or moved object, wherein no significant artifacts are left over from the inpainting process.

20. The method of any preceding embodiment, wherein said method is configured for use in an application selected from the group of applications consisting of: (a) reconstructing missing parts in scanned or old photos; (b) removing text or logos overlaid on an image or video frame; (c) removing, or moving, undesired object(s) from an image or video; (d) recovering missing blocks in image coding and transmission; (e) addressing disocclusion problems in stereo imaging, whereby occluded areas in a digital image are recovered in response to interpolation from their vicinity; (f) generating various 3D effects where one or more objects from a still photo are extracted into a foreground and motion video segments generated of that image; and (g) zooming and super-resolution of image and video frames.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for inpainting missing, removed, or moved, objects or areas in an image frame, comprising:
  (a) a computer processor; and
  (b) programming executable on said computer processor for performing steps comprising:
    (i) identifying structure regions that reach an edge of a missing, removed, or moved area in an image frame;
    (ii) prioritizing a fill order for each structure region in response to its depth (distance) from the camera;
    wherein information about depth across the image frame is obtained prior to commencing inpainting, and is obtained in response to two picture blur matching;
    (iii) filling each said structure region in its prioritized fill order; and
    (iv) filling remaining areas of the missing, removed, or moved, object area to complete inpainting of the image frame.

2. The apparatus recited in claim 1, wherein said programming executable on said computer processor is configured for performing said identifying structure regions in prioritizing a fill order for structure regions in response to a structure analysis.

3. The apparatus recited in claim 1, wherein said programming executable on said computer processor is configured for utilizing information about said depth to set priorities for infilling order of structures, so that structure regions are filled in order, after which remaining homogeneous regions are filled to produce the inpainted image.

4. The apparatus recited in claim 1, wherein said programming executable on said computer processor is configured for detecting structures and assigning a priority to each structure based on its depth value, with elements and structures closer to an image capture device receiving higher priorities, because a close object can occlude a farther object but a farther object does not occlude a closer object.

5. The apparatus recited in claim 1, wherein said two picture blur matching is performed during an autofocusing process.

6. The apparatus recited in claim 1, wherein results from said inpainting is configured so that structures adjacent to a missing, removed, or moved, object are reconstructed through the missing, removed, or moved object, wherein no significant artifacts are left over from the inpainting process.

7. The apparatus recited in claim 1, wherein said apparatus is configured for use in an application selected from the group of applications consisting of: (a) reconstructing missing parts in scanned or old photos; (b) removing text or logos overlaid on an image or video frame; (c) removing, or moving, undesired object(s) from an image or video; (d) recovering missing blocks in image coding and transmission; (e) addressing disocclusion problems in stereo imaging, whereby occluded areas in a digital image are recovered in response to interpolation from their vicinity; (f) generating various 3D effects where one or more objects from a still photo are extracted into a foreground and motion video segments generated of that image; and (g) zooming and super-resolution of image and video frames.

8. An apparatus for inpainting missing, removed, or moved, objects or areas in an image frame, comprising:
  (a) a computer processor; and
  (b) programming executable on the computer processor for performing steps comprising:
    (i) identifying structure regions that reach an edge of a missing, removed, or moved area in an image frame;
    (ii) prioritizing a fill order based on a structure analysis for each structure region in response to its depth (distance) from a device capturing said image frame;
    wherein said information about depth across the image is obtained prior to commencing inpainting in response to two picture blur matching;
    (iii) filling each said structure region in its prioritized fill order based on depth; and (iv) filling remaining homogeneous areas of the missing, removed, or moved, object area to complete inpainting of an image.

9. The apparatus recited in claim 8, wherein said programming executable on said computer processor is configured for detecting structures and assigning a priority to each structure based on its depth value, with elements and structures closer to an image capture device receiving higher priorities, because a close object can occlude a farther object but a farther object does not occlude a closer object.

10. The apparatus recited in claim 8, wherein said two picture blur matching is performed during an autofocusing process.

11. The apparatus recited in claim 8, wherein results from said inpainting is configured so that structures adjacent to a missing, removed, or moved, object are reconstructed through the missing, removed, or moved object, wherein no significant artifacts are left over from the inpainting process.

12. The apparatus recited in claim 8, wherein said apparatus is configured for use in an application selected from the group of applications consisting of: (a) reconstructing missing parts in scanned or old photos; (b) removing text or logos overlaid on an image or video frame; (c) removing, or moving, undesired object(s) from an image or video; (d) recovering missing blocks in image coding and transmission; (e) addressing disocclusion problems in stereo imaging, whereby occluded areas in a digital image are recovered in response to interpolation from their vicinity; (f) generating various 3D effects where one or more objects from a still photo are extracted into a foreground and motion video segments generated of that image; and (g) zooming and super-resolution of image and video frames.

13. A method for inpainting missing, removed, or moved, objects or areas in an image frame, comprising:
(a) identifying structure regions that reach an edge of a missing, removed, or move area in an image frame for which image processing is being performed on a computer-enabled device;
(b) prioritizing a fill order for each structure region in response to its depth (distance) from a camera device capturing said image frame;
wherein information about depth (distance) across the image frame is obtained prior to commencing inpainting, and is obtained in response to two picture blur matching;
(c) filling each said structure region in its prioritized fill order within an inpainting process; and
(d) filling remaining areas of the removed object area within the inpainting process.

14. The method recited in claim 13, wherein said detecting structures and assigning a priority to each structure based on its depth value is performed so that elements and structures closer to an image capture device receive higher priorities, because a close object can occlude a farther object but a farther object does not occlude a closer object.

15. The method recited in claim 13, wherein results from said inpainting is configured so that structures adjacent to a missing, removed, or moved, object are reconstructed through the missing, removed, or moved object, wherein no significant artifacts are left over from the inpainting process.

16. The method recited in claim 13, wherein said method is configured for use in an application selected from the group of applications consisting of: (a) reconstructing missing parts in scanned or old photos; (b) removing text or logos overlaid on an image or video frame; (c) removing, or moving, undesired object(s) from an image or video; (d) recovering missing blocks in image coding and transmission; (e) addressing disocclusion problems in stereo imaging, whereby occluded areas in a digital image are recovered in response to interpolation from their vicinity; (f) generating various 3D effects where one or more objects from a still photo are extracted into a foreground and motion video segments generated of that image; and (g) zooming and super-resolution of image and video frames.

* * * * *